United States Patent Office 2,883,263
Patented Apr. 21, 1959

2,883,263

METHOD FOR PURIFYING SODIUM BOROHYDRIDE

Robert W. Bragdon, Marblehead, Mass., assignor to Metal Hydrides Incorporated, Beverly, Mass., a corporation of Massachusetts No Drawing. Application April 3, 1956
Serial No. 575,709

2 Claims. (Cl. 23—14)

This invention relates to the preparation of sodium borohydride of high purity. The invention relates particularly to the purification of a crude sodium borohydride obtained by separation from a reaction mixture of sodium borohydride and sodium methoxide prepared by reacting sodium hydride with methyl borate as illustrated by the equation:

$$4NaH + B(OCH_3)_3 \rightarrow NaBH_4 + 3NaOCH_3 \qquad (1)$$

One method for separating the sodium borohydride from such a reaction mixture is to treat the latter with a solvent for sodium borohydride in which the sodium methoxide is substantially insoluble. Such solvents are well known and are illustrated by liquid ammonia and the lower alkylamines. In commercial practice either liquid ammonia or isopropylamine usually has been used for this purpose. This solvent treatment produces a liquor comprising a solution of sodium borohydride in the solvent and a solid residue. This solution is separated and the solvent is removed, as by evaporation, to obtain a crude solid sodium borohydride. This crude product usually contains from about 88 to 92 percent by weight of sodium borohydride and its purity is unsatisfactory for many commercial uses.

Several methods have been proposed for increasing the purity of this product. United States Patent No. 2,615,788 describes a method which involves treatment of the crude product with diborane but this method is unsatisfactory because diborane is a difficult gas to handle, is very expensive, and is not commercially available. The United States Patent No. 2,542,746 proposes the addition of controlled amounts of water to react with the impurities to form compounds which are insoluble in amine solvents for sodium borohydride. This method has not proved entirely satisfactory because it does not usually up-grade the purity sufficiently in one step. Another method involves the recrystallization of crude sodium borohydride from water, the product crystallizing as the dihydrate which is extremely difficult to convert to the desired anhydrous form. Another method involves re-extraction of the product but this technique does not up-grade the purity sufficiently to be satisfactory for treating products containing less than 93 percent sodium borohydride.

The present invention provides a simple method for treating crude sodium borohydride to increase its purity markedly. By the method of the invention products containing 98.5 percent or more of sodium borohydride can be obtained by treating crude sodium borohydride containing less than 75 percent sodium borohydride.

The present invention is based upon the discovery that when crude sodium borohydride, obtained as previously described, is heated at a temperature between about 270° C. and about 350° C. for a sufficient period of time, preferably under reduced pressure, substantially all the impurities therein can be decomposed to form a volatile compound and a compound which is substantially insoluble in liquid ammonia. The required period of heating at this temperature varies with the amount of impurities in the crude product. In some instances, heating for a period of about 30 minutes is sufficient while, in other instances, heating for a period of about 2 hours is required. The required period of heating usually is reduced if the heating is conducted under reduced pressure. If desired, the crude product may be agitated while being heated. Heating for a period longer than actually required to decompose all the impurities is not injurious to the product. After substantially all the impurities in the crude product have been decomposed in this manner, the product is cooled and extracted with liquid ammonia to form a liquor comprising a solution of sodium borohydride in liquid ammonia and an insoluble residue. The solution is separated and the solvent removed, as by vacuum evaporation, to obtain solid sodium borohydride of high purity.

In the course of my investigations I made the following test. A reaction mixture of sodium borohydride and sodium methoxide was prepared by reacting sodium hydride with methyl borate. This reaction mixture then was heated at a temperature of about 275° C. for about 2 hours. After cooling, the product was extracted with liquid ammonia. The solution borohydride was separated from the insoluble residue and the solvent was removed to obtain solid sodium borohydride. The purity of this product was not satisfactory. This test indicates that for satisfactory results in the practice of the present invention, the crude product treated should be the crude sodium borohydride produced by removing the solvent from a solution obtained by treating a reaction mixture comprising sodium borohydride and sodium methoxide with a solvent for sodium borohydride, such as liquid ammonia or isopropylamine, in which sodium methoxide is substantially insoluble. In other words, the crude product treated in accordance with the present invention must be the crude sodium borohydride product which has been separated from said reaction mixture. However, instead of producing the reaction mixture by reacting sodium hydride with methyl borate as illustrated by Equation 1 above, it can be produced by reacting sodium hydride with sodium trimethoxyborohydride as illustrated by the equation:

$$3NaH + NaBH(OCH_3)_3 \rightarrow NaBH_4 + 3NaOCH_3 \qquad (2)$$

A crude sodium borohydride then may be separated from this reaction mixture as previously described.

The invention is illustrated further by the following specific example in which the crude sodium borohydride used was obtained by liquid ammonia extraction of a reaction mixture prepared by reacting sodium hydride with methyl borate. One hundred and fifty grams of the crude sodium borohydride containing 70.6 percent by weight of sodium borohydride was placed in a one-liter, round-bottom, one-necked flask. This material was heated to a temperature of 275° to 300° C. for two hours while subjected to a reduced pressure created by a "Pressovac" pump. After cooling, the material was found to assay 80.1 percent sodium borohydride, indicating that some impurities had been removed by this vacuum-heat treatment. Forty grams of the material so treated were extracted with liquid ammonia at 0° C. The mixture was filtered at 0° C. The clear filtrate was vacuum-evaporated to dryness and then heated in a vacuum oven at 100° C. The resulting product assayed 98.6 percent by weight of sodium borohydride.

I claim:

1. In the method of preparing sodium borohydride which comprises forming a reaction mixture comprising sodium borohydride and sodium methoxide by reacting sodium hydride with a compound selected from the group consisting of trimethyl borate and sodium trimethoxyborohydride, subjecting said reaction mixture to the action of a solvent for sodium borohydride in which sodium methoxide is substantially insoluble to obtain a liquor comprising a solution of sodium borohydride in said solvent and an insoluble residue, separating said solution from said residue, and removing the solvent from said solution to obtain crude sodium borohydride, the improvement which comprises heating the crude sodium borohydride at a temperature between about 270° C. and 350° C. for a period between about 30 minutes and 2 hours, then cooling the heated material and treating it with liquid ammonia to form a liquor comprising a solution of sodium borohydride in liquid ammonia and an insoluble residue, and separating the latter solution and removing the ammonia therefrom to obtain solid sodium borohydride.

2. The method as described by claim 1 wherein the crude sodium borohydride is heated at said temperature while being subjected to a pressure less than atmospheric pressure.

References Cited in the file of this patent

UNITED STATES PATENTS

| | | |
|---|---|---|
| 2,542,746 | Banus et al. | Feb. 20, 1951 |
| 2,615,788 | Gibb | Oct. 28, 1952 |

OTHER REFERENCES

Goodwin, Jr., et al.: "Boron, Boron Hydrides, and Related Substances," compiled for the Bureau of Aeronautics under Government Order NAer01625, printed April 1955, part II, page 64.

Banus et al.: "Progress Report, Contract NOa(s) 9901, Bureau of Aeronautics," printed Oct. 23, 1949, prepared by Metal Hydrides, Incorporated, declassified Nov. 5, 1953, five pages.

Schechter et al.: "Boron Hydrides and Related Compounds," prepared under Contract Noa(s) 10992 for Department of Navy, Bureau of Aeronautics, prepared by Callery Chemical Co., printed March 1951, declassified December 1953, page 50.